(12) United States Patent
McCall (10) Patent No.: US 7,758,091 B1
(45) Date of Patent: Jul. 20, 2010

(54) COLLAPSIBLE LADDER RACK SYSTEM FOR VEHICLES

(76) Inventor: Donny Allen McCall, 165 Maple St., Sparta, NC (US) 28675

( * ) Notice: Subject to any disclaimer, the term of this patent is extended or adjusted under 35 U.S.C. 154(b) by 81 days.

(21) Appl. No.: 11/809,603

(22) Filed: Jun. 1, 2007

Related U.S. Application Data (60) Provisional application No. 60/803,813, filed on Jun. 2, 2006.

(51) Int. Cl.
*B60P 3/00* (2006.01)
(52) U.S. Cl. .......................................... 296/3; 224/405
(58) Field of Classification Search ................. 296/3, 296/26.01, 26.06, 26.07, 37.6; 224/405, 224/403, 402; 410/44
See application file for complete search history.

(56) References Cited

U.S. PATENT DOCUMENTS

| | | | |
|---|---|---|---|
| 3,460,864 A | 8/1969 | Piercy | |
| 3,765,713 A | 10/1973 | Suitt | |
| 3,891,262 A | 6/1975 | Brunel | |
| 4,398,763 A | 8/1983 | Louw | |
| 4,659,131 A | 4/1987 | Flournoy, Jr. | |
| 5,037,152 A | 8/1991 | Hendricks | |
| 5,152,570 A * | 10/1992 | Hood | 296/3 |
| 5,752,734 A * | 5/1998 | Ward et al. | 296/3 |
| 6,227,592 B1 * | 5/2001 | Thacker | 296/26.07 |
| 6,634,689 B1 * | 10/2003 | Soto | 296/3 |
| 6,752,301 B1 | 6/2004 | Drolet | |
| 2002/0125728 A1 * | 9/2002 | Chambers | 296/3 |
| 2003/0201656 A1 | 10/2003 | Ferguson et al. | |
| 2004/0026945 A1 * | 2/2004 | Kench et al. | 296/3 |

* cited by examiner

*Primary Examiner*—Glenn Dayoan
*Assistant Examiner*—Melissa A Black
(74) *Attorney, Agent, or Firm*—Robert W. Pitts (57) ABSTRACT

A collapsible ladder rack system for use on pickup truck or similar vehicle. The rack system includes housings, main arms, material arms, extension arms, and supporting braces. The housings are secured to the rails. The hinged main arms rise vertically and are locked into place by braces. The hinged material arms rise horizontally and lock into place with braces. The extension arms telescope out of two of the material arms and insert into the empty material arms and lock into place. When the ladder rack is no longer needed, the steps are reversed so that the other rack components collapse into the housings on the bed rails. Accessory components can be mounted on the rack to enhance the capabilities of the system.

16 Claims, 14 Drawing Sheets

COLLAPSIBLE LADDER RACK SYSTEM FOR VEHICLES

CROSS REFERENCE TO PRIOR CO-PENDING APPLICATION

This application claims the benefit of the filing date of prior Provisional Patent Application 60/803,813 filed Jun. 2, 2006 and entitled Collapsible Ladder Rack System for Vehicles.

BACKGROUND OF THE INVENTION

This invention relates to ladder racks for vehicles, in particular pickup trucks or flat-bed trucks. This invention solves a problem for many truck owners, in that they need a ladder rack sometimes but not all the time. Many truck owners use their personal truck as their work truck as well. Most ladder racks are large, bulky, and cumbersome to take off if so desired. If it is taken off the truck, there must be a place to store the large apparatus. This invention addresses and solves these problems. The collapsible nature of this invention allows for the use of a ladder rack when needed and the return to the original appearance of the truck when not. Not only would this benefit people that are in the construction trade for carrying ladders, lumber, pipe, etc., it would be beneficial for the "weekender" that only needs to carry long materials on an occasional basis. The invention would also work well for recreational use, where canoes, kayaks, etc. could be placed on top of the ladder rack. Having the ladder rack also opens the capabilities of the truck so that the bed can be utilized while the long material rides on the rack.

SUMMARY OF THE INVENTION

A rack according to one aspect of this invention can be used on a vehicle, such as a pickup truck having a flat bed, although the invention is not limited to use on pickup trucks. The rack includes a pair of housings that can be mounted on the vehicle on opposite sides of the flat bed. The pair of housings extend between front and back ends of the flat bed. Upright main arms are attached to the housings at four corners of the flat bed. Each upright main arm is hinged relative to the housing to which the main arm is attached. Each main arm can be folded from an upright position toward a central section of the housing to which the main arm is attached. Each main arm includes side walls extending upwardly from opposite ends of a base wall so that the side walls and the base wall form a U-shaped member with a main arm channel defined between the side walls. Each channel opens inwardly. The rack also includes a material arm mounted on an upper end of each upright main arm. Each material arm is hinged relative to the upright main arm on which the corresponding material arm is mounted. Each material arm can be folded into the main arm channel on the main arm to which the material arm is attached. Each material arm can be then be folded into a corresponding main arm channel and each main arm may be folded relative to the corresponding housing after the material arms are folded into corresponding channels.

A rack according to another aspect of this invention includes two housings, each attachable to rails on a side of a bed on the pickup truck. Four main arms forming part of the rack are attached at lower ends thereof to opposite ends of each housing. Main arm braces extend between main arms and a housing from which the corresponding main arm extends. The main arm braces secure the main arm in an upright position relative to the housings. Material arms are attached to each main arm at upper ends of corresponding main arms. The material arms extend horizontally relative to material arms in an upright position. Material arm braces extend between main arms and a material arm from which the corresponding main arm extends. The material arm braces secure the material arms in a horizontal position relative to the main arms. The main arm braces can be disengaged from the housings and the material arm braces can be disengaged from the main arms so that the material arms and main arms may be folded relative to each other and relative to the housing so that the main arms, the material arms, the main arm braces and the material arm braces can be folded into the housings to position the rack in a folded configuration on top of the rails on the pickup truck. The housings provide a storage compartment that does not interfere with the use of the truck when the ladder rack is stored.

A rack according to this invention can be attached to and removed from bed rails extending upwardly on opposite sides of a bed on a motor vehicle. The rack can be shifted between a collapsed position and an upright position. This rack includes separate upwardly facing channels formed on a U-shaped housing attachable to the bed rails. Separate inwardly facing channels are formed on U-shaped main arms hinged relative to the U-shaped housings. Front and rear material arms are hinged relative to the main arms at the front and rear of each housing. The front and rear material arms can be folded into inwardly facing channels. The main arms, with the material arms received within inwardly facing channels, can be folded into the upwardly facing channels on the U-shaped housings so that the main arms and the material arms can be folded into the housings in the collapsed position.

BRIEF DESCRIPTION OF THE DRAWINGS

FIGS. 11A-11C show a ladder rack extender attachable to the main arms.

FIGS. 13A and 13B are views of a sheet goods carrier.

DETAILED DESCRIPTION OF THE PREFERRED EMBODIMENTS

Figure 1:
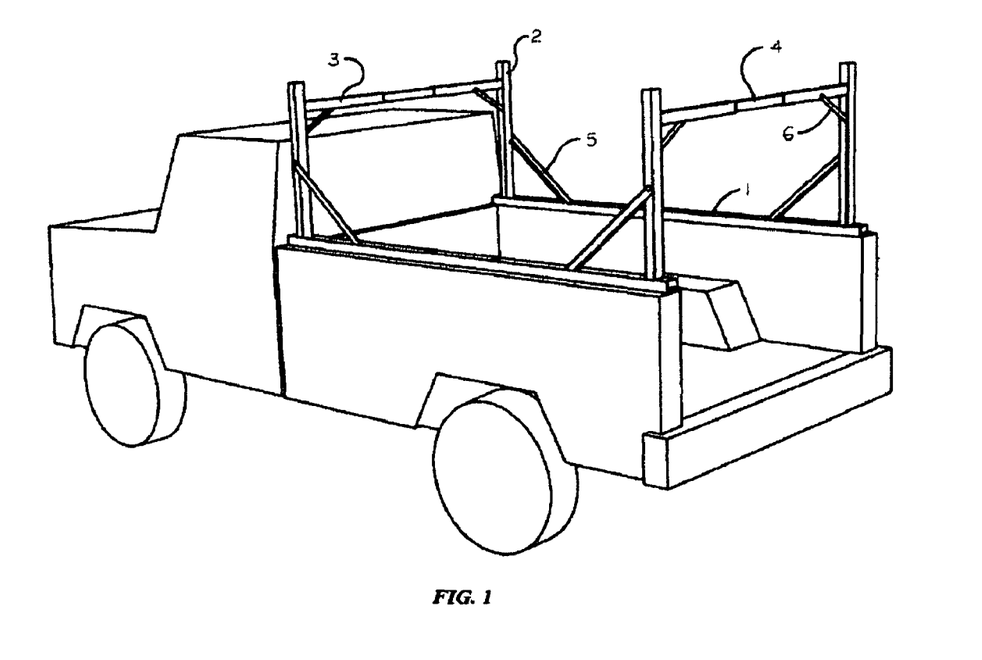
FIG. 1 is a side view of the ladder rack fully actuated and consists of the following components: Housing 1, Main Arm 2, Material Arm 3, Extension Arm 4, Main Arm Brace 5, Material Arm Brace 6.
Figure 2:
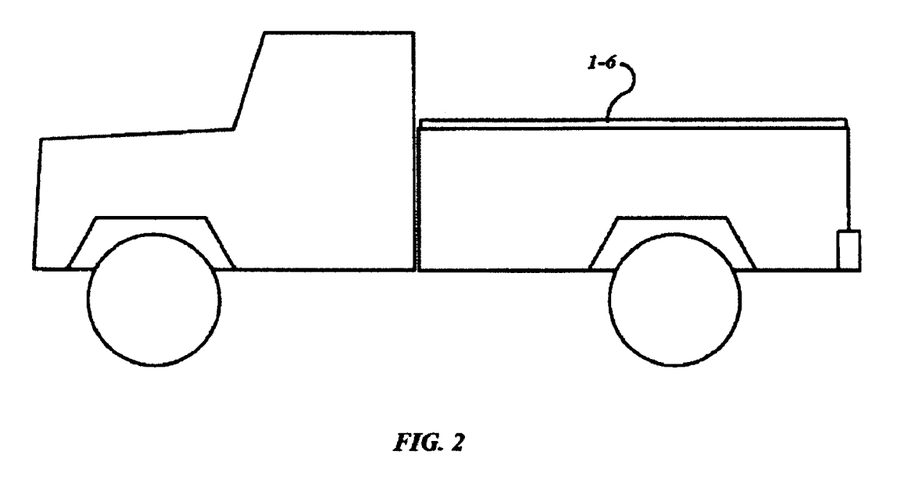
FIG. 2 is a side view of the ladder rack when fully collapsed.
Figure 3:
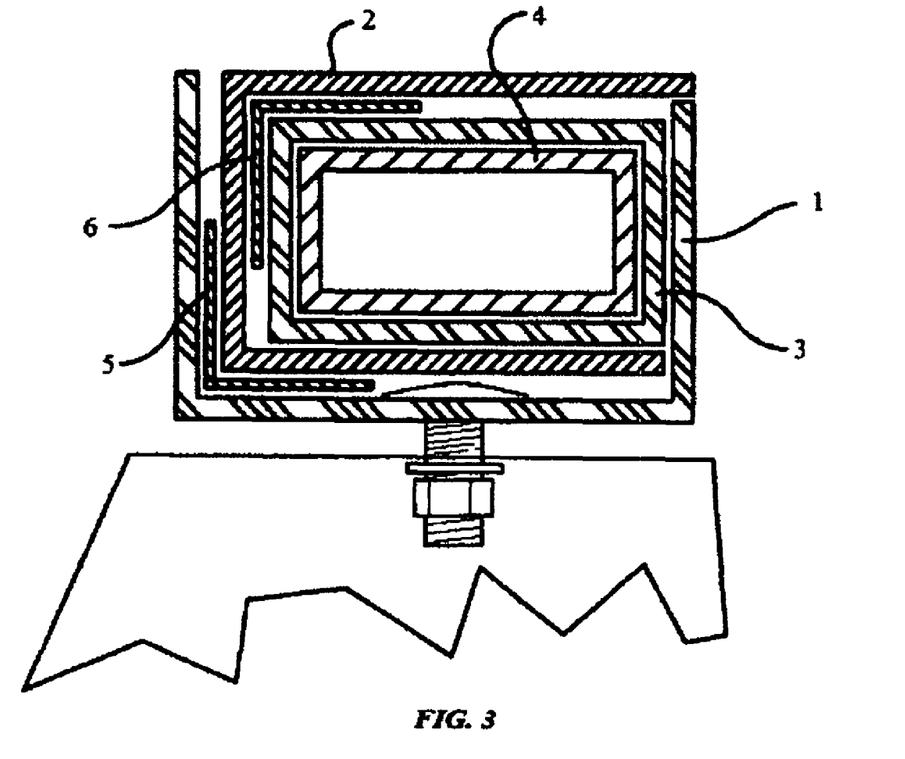
FIG. 3 is a representative end, cross-section view of how the ladder rack's components will fit together when fully collapsed.
Figure 4:
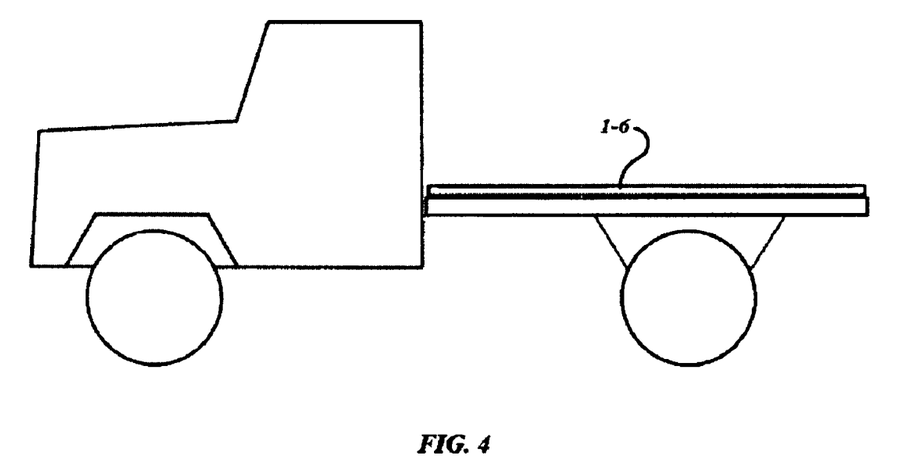
FIG. 4 is a side view of the fully collapsed ladder rack on a flat-bed truck.

FIG. 1 is a view of one representative embodiment of the ladder rack system. Components of this ladder rack embodiment include a Housing 1, Main Arm 2, Material Arm 3, Extension Arm 4, Main Arm Brace 5, and Material Arm Brace 6.

There are at least two housings 1 in each ladder rack 10. The housings 1 will preferably attach, to the bed rails of pickup trucks or the rails of pull-behind trailers, or be attached to floors of flat-bed pickups or larger trucks and the like and can be available in various lengths to fit the various lengths of vehicles. They will preferably be attached to the rails by drilling at least two holes through the housing 1 and bedrail and connecting the two with nuts and bolts. They could also be secured to the rails by other means such as C-clamps or a clamp system that could be integrated into the housing that would allow for there to be no drilling required.

The preferred embodiment of the housings 1 would be of an extruded, squared U-shaped aluminum channel of at least 3" wide and 2" high and approximately 8' long for long-bed trucks, approximately 6' for short-bed trucks and approximately 4' long for extra short or sport trucks. However, the width, height and length of the housing 1 could be made smaller or larger, depending on the best mode of construction for greatest strength and compact design. The housing would be of an appropriate size so that the rest of the components fully collapsed would fit flush with the top of the housing walls and be protected from impact by tools, ladders, lumber, etc. Caps attached to each end of the housings would enable the housings to retain their shape and protect components from impact. Also, when the system is fully collapsed, the main arms 2 are not long enough to meet in the center of the housing 1, therefore a plate or the like would be added, to cover that span and help the housing to retain its shape. This plate or cover can be shiftable back and forth so that it can secure the ends of the main arms 2.

At either end of the housing, preferably 1" in from the end, will preferably be a connection point where the main arm 2 can attach to the housing. In this first embodiment a hinge that is riveted to the bottom of the housing channel and the bottom of the main arm 2. This could also be accomplished by bolting the main arm 2 to the walls of the housing 1 or riveting the walls of the main arm 2 to the walls of the housing 1 or the like.

The housing 1 can be made of an extruded aluminum channel that is wide enough and high enough to hold and protect the rest of the collapsible rack's components when fully collapsed. It can be at least 1" wide, 1" high and 1" long. Although an aluminum alloy of which there are about 17,000 different types is the preferred embodiment of the housing as well as the rest of the components of the collapsible ladder rack system for its strength, light weight and rust resistant properties, it could be made from numerous materials, such as steel, iron, copper, titanium, platinum, any ferrous or non-ferrous metal, wood, plastic, or any composite based material. The housing could be made in different ways. Although the preferred embodiment of the housing 1 is U-shaped, the housing 1 could also be just a flat piece of material that is connected to the rails so that the rest of the ladder rack's components would have a secure connection to the rails. The housings will be of varying lengths, depending on the vehicle and length of the rails on which they will sit. Although they could vary, the rest of the components of the collapsible ladder rack system main arms 2, material arms 3, extension arms 4, main arm braces 5, and material arm braces 6 should be of standard lengths no matter what type of vehicle it is installed on.

The main arms would consist of at least 4 components per unit, except in the case of the extra short truck bed where only 2 main arms will be utilized. The preferred embodiment of the main arms 2 would preferably be of a squared U-shaped extruded aluminum channel of an approximate length at least 27" long: The back wall of the main arm would preferably be approximately 1¾" wide so when collapsed, it will preferably appear flush with the top of the housing side walls. The side walls of the main arm would preferably be approximately 2¾" wide so they should also fit inside of the housing. The open side of the U-channel main arms 2 will preferably face toward the inside of the truck bed so that the other components can pivot toward each other and fit within the arm channel. Caps or the like will preferably be attached to both ends of the main arms to retain its shape, add strength and protect the other components. The variations to the main arms would mainly consist of, but not be limited to, the specific size of the components and the materials used. The U-shaped configuration of the main arms 2 permit these main arms to be sturdier than for configurations in which the main uprights might be tubular components with extension components.

Attached to the main arm 2 and the housing 1 will preferably be a main arm brace 5, of which there should be at least 4 per unit, except in the case of the extra short bed where only 2 braces will be utilized. And attached to the main arm and the material arm will preferably be a material arm brace 6, of which there should be at least 4 per unit, except in the case of the extra short bed where only 2 be utilized. The purposes of these braces are to securely lock the main arm 2 in the vertical position and the material arm 3 in the horizontal position. The braces should preferably be substantial in strength because of the possibility of heavy material lumber, pipe, ladders, etc. riding on top of the ladder rack. Not only will they preferably need static tensile strength, but will also preferably need to be strong enough to withstand the pressure of twists and turns on winding roads with a load on top. In this embodiment the braces 5 and 6 are fabricated from an L-shaped aluminum angle of approximately 1" by 1" by 16" in length.

One end of the main arm brace could be riveted, bolted, or otherwise attached at a point on a wall of the main arm 2. The other end would preferably be attached to a sliding mechanism 7 along the inside side wall of the housing 1. As the main arm 2 is raised vertically, the main arm brace 5 would preferably slide along a channel on the housing 1. When the main arm 2 reaches vertical, the main arm brace 5 will preferably lock into a slot at an optimum angle for the most strength. Likewise, one end of the material arm brace 6 will preferably attach to a wall of the material arm 3, and the other to a wall of the main arm 2. There are numerous variations to the main arm brace 5, which could also translate to the material arm brace 6. The brace itself could be a center point hinged brace like a step ladder brace and attach to the floor of the housing and the lower side wall of the main arm. Instead of an L-shaped brace, it could be a flat brace with a fluted indention to add strength. It could also be attached at several different locations along the main arm, material arm, and the housing. Instead of sliding along a channel along the housing wall, the brace could be attached to the main arm or the housing and free floating on the other end. As the main arm is raised vertically, the main arm brace would swing free and then be physically attached to a locking mechanism along the wall of the housing or along floor of the housing or at some point on the main arm. Likewise, the material arm brace could attach at one end to either the main arm or the material arm, and as the material arm is raised horizontal, the material arm brace could attach to some point along the material arm or the main arm depending on which arm the brace is permanently attached. Also, as explained with the housing, the braces could be made using many other materials besides aluminum see list above.

In this first embodiment, the material arm 3 is fabricated using extruded aluminum tubing of approximately 1½" by 2½" by 24". However, the size of the material arm may vary, depending on its ideal size to fit inside the main arm. There should be at least 4 material arms per unit, except in the case of the extra short bed where only 2 will be utilized. There will preferably be a hinged location on the main arm 2 preferably at least 1" down from the top to which the material arm 3 will preferably be attached. Just as the housing 1 is attached to the main arm 2, the material arm 3 could be attached to the main arm 2 in a like manner, including all variations. Similarly to the main arm 2 rising vertically, the material arm 3 will preferably rise until the material arm brace 6 locks it into the horizontal position. This is the surface on which the owner's material will preferably rest. The material arms 3 will likely encounter the most abuse and wear and tear of the entire unit. The material arms 3 should be thick enough and strong enough to withstand the repeated punishment of ladders and/or other materials being slid across them, dropped on them and the like, but can, of course, be made thinner and less strong, perhaps in economy models. Therefore, the main variations to the material arms 3 would mainly consist of, but not be limited to the specific size of the components and the materials used. When all of the material arms 3 of the unit are raised horizontally, they will be too short to meet in the middle of the truck. Therefore, there will preferably be an extension arm 4 to span this gap.

Extension arms 4 will telescope from out of at least two of the material arms per unit, except in the case of the extra short bed where only 1 will be utilized. The preferred embodiment of the extension arm 4 is of an extruded aluminum tubing of an appropriate length, width and height to fit inside the material arm 3. It will be approximately 1¼" by 1¼" by 22". The extension arm 4 should not slide completely into the "holding" material arm 3 so that it can be grasped easily and telescoped into the empty material arm 3. The length of this span could vary depending on the size of the owner's vehicle or trailer to which it is attached. The empty material arm 3 should receive the extension arm 4 in a male to female connection. The extension arm 4 will preferably have a detent ball mechanism that should be squeezed to allow the extension arm 4 to be received into the empty material arm 3. The empty material arm 3 will preferably have holes drilled approximately 2" in from the open end. Once the extension arm 4 is inside the empty material arm 3, it should continue to be pushed in until the detent balls positively lock the extension arm 4 in place. The holding material arm 3 will not positively lock the extension arm 4, thereby giving the flexibility for the same collapsible ladder rack to be installed on a truck the size of a Ford Ranger and one the size of a GMC Sierra. It would just be a matter of how far out the extension arm 4 has to travel to span that gap. At least one variation to the extension arm is to not have a detent ball mechanism, but to have the holes on the empty material arms to match similar holes on the extension arm and use a separate pin to lock the extension arm in place. This relies on outside parts that would have to be kept up with, which is not in the spirit of the invention. Other variations might include, but are not limited to size and material used.

Figure 5:
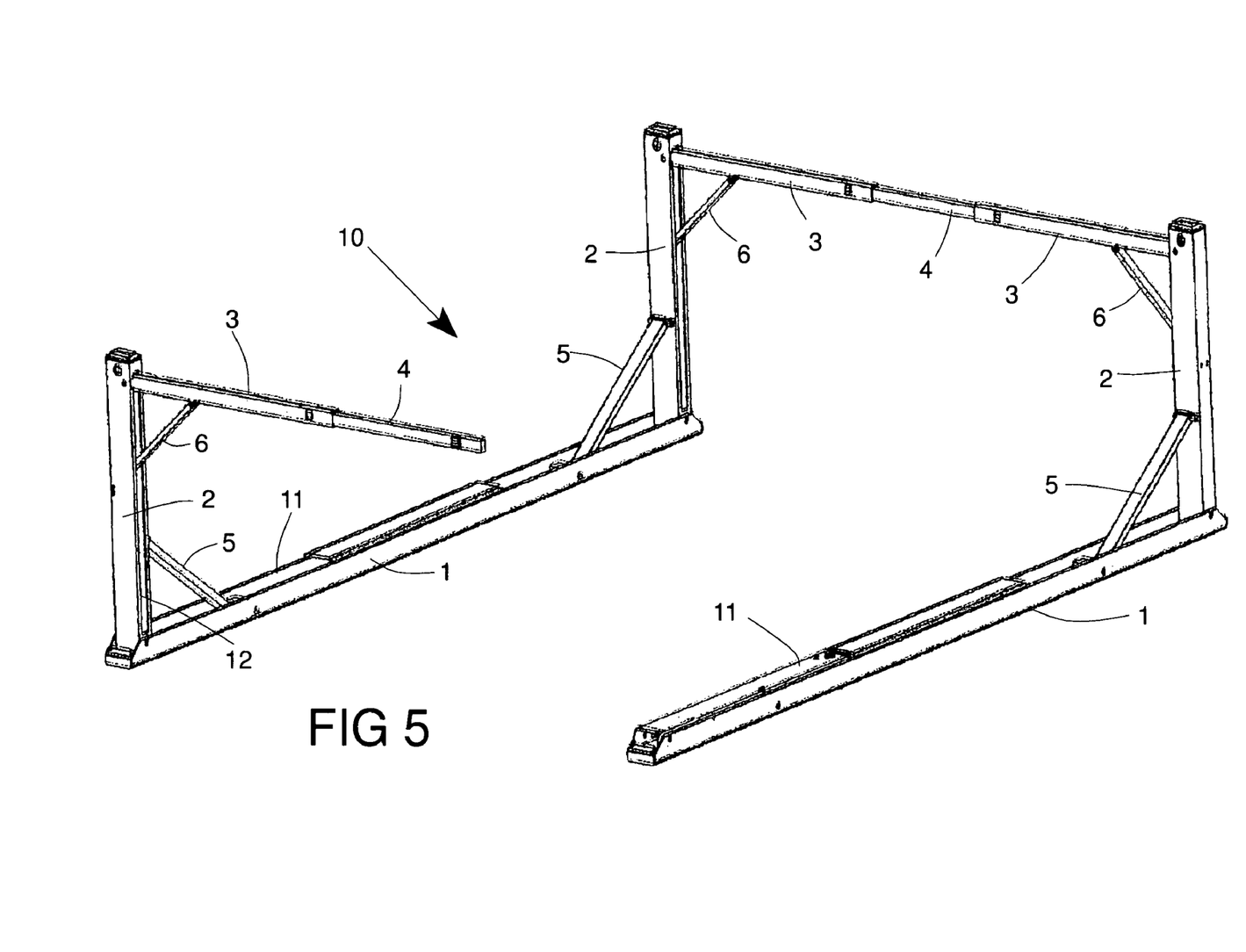
FIG. 5 is a perspective view of the rack with three material arms actuated and one material arm collapsed.

FIGS. 5-10 show more detailed views of individual components a slightly different version of the rack assembly 10. FIG. 5 shows three main arms 2 in a upright position supported in position by main arm braces 4. One main arm 2 is in its collapsed or retracted position located with the corresponding housing arm channel 11. At the rear of the rack 10, both of the main arms 2 are in their upright position with material arms 3 deployed in an operative horizontal position, supported relative to corresponding main arms 2 by material arm braces 6. An extension arm 4 extends between inner ends of opposed material arms 3, and the extension arm 4 extends into openings at the ends of the two opposed material arms 3. The extension arm 4 on the front of rack 10 projects from a deployed front material arm 3 so that it can engage the material arm 3 attached to the retracted and stored main arm 2, when that main arm 2 and corresponding material arm are deployed in an upright operative position.

Figure 6:
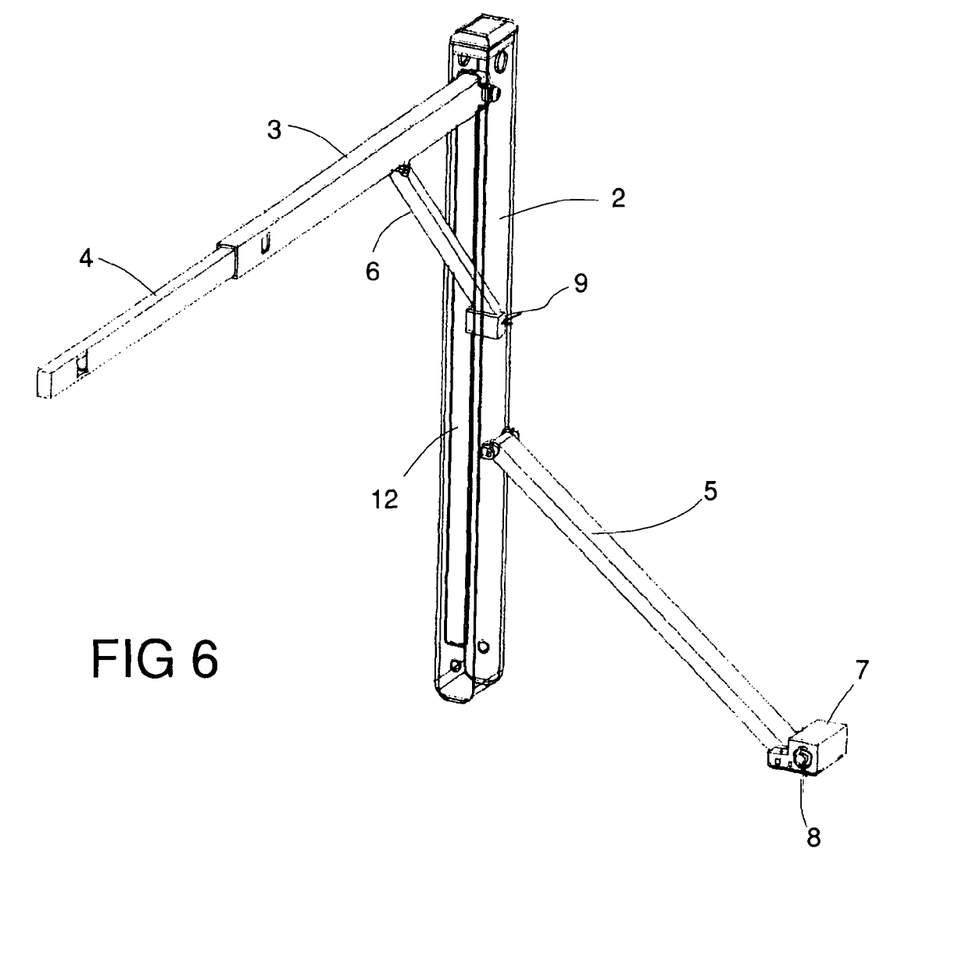
FIG. 6 is a view of the arm assemblies with the following components: Main Arm 2, Material Arm 3, Extension Arm 4, Main Arm Brace 5, Material Arm Brace 6, Sliding Block 7, Locking Push Button 8, Material Arm Brace Holder 9.

FIG. 6 shows the manner in which the main arm braces 5 and the material arm braces 6 engage one of the main arms 2. Main arm 2 is a U-shaped member with parallel side walls extending perpendicular to a base wall defining a channel 12, that extends from adjacent one end of the main arm 2 to adjacent the other end. One end of material arm brace 6 extends into channel 12, and a sliding arm brace holder 9, mounted on that end of the material arm brace 6 is positioned within channel 12. The opposite end of the material arm brace 6 is pivotally mounted intermediate the ends of the material arm 4 about a hinge so that when the material arm 3 is rotated into the channel 12, the sliding arm brace holder 9 will slide within channel 12 and the material arm will nest in the main arm channel 12.

The main arm brace 5 is pivotal about the main arm 2 about a hinge that is attached to the side walls forming the channel 12. The main arm brace 5 thus rotates in a plane that is extends perpendicular to the main arm channel 12 and the perpendicular to the plane in which the material arm brace 6 will rotate. A main arm sliding block 7 is attached to the opposite end of the main arm brace 5, and this main arm sliding block 7 is dimensioned for receipt within the housing channel 11. A spring loaded locking push button 8 extends from one face of the main arm sliding block 7, and this push button 8 is dimensioned for receipt within a hole 13 on and adjacent sidewall forming the housing channel 11. When the main arm 2 is in its fully extended position, the push button 8 will be received within this aligned hole 13 on the housing 1 and the main arm brace 5 will be locked in its upright position. To retract the main arm 5 into its stored position within housing channel 11, the push button 8 is first depressed to release the main arm brace 5 so that the main arm 5 can pivot into its corresponding housing channel 11.

Figure 7:
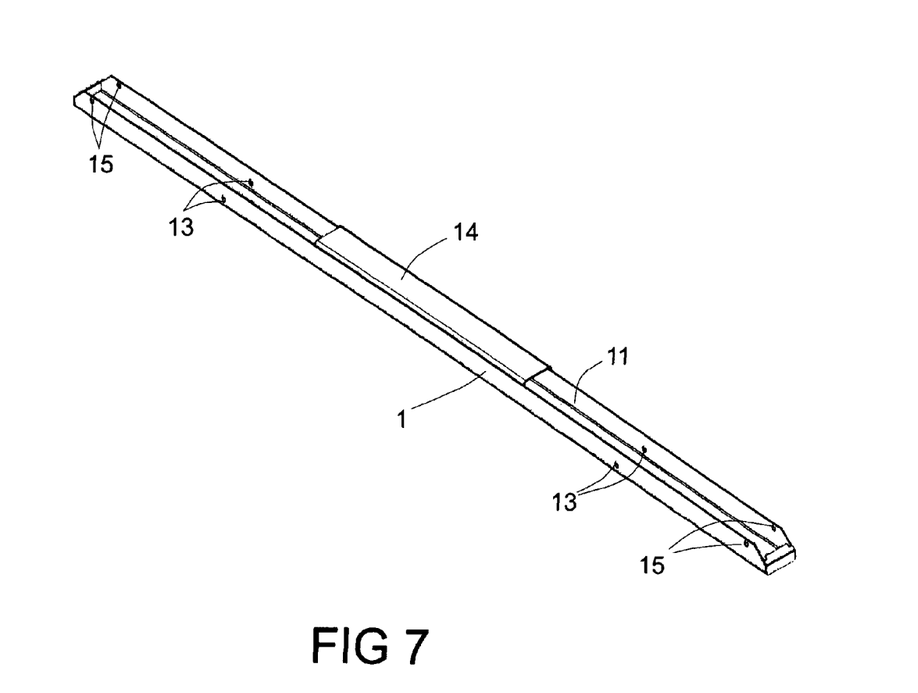
FIG. 7 is a perspective view of the empty Housing 1.

FIG. 7 shows the housing and the housing channel 11, which will face upward when the housing 1 is attached to one of the sides of a pickup truck next to the bed or when the housing 1 is attached to a flat bed on a vehicle. Housing 1 is a U-shaped member with to upright sidewalls extending upward from a housing base wall to form the housing channel 11. Aligned holes 15 are located in each end of the upright housing walls to receive a hinge pin mounted on the corresponding main arm 2, so that the main arm 2 can rotate between and upright and a retracted or stored position. Holes 13 for receiving spring loaded pins 8 are evenly spaced from the opposite ends of the channel 11 so that the main arm 2 can be locked into its upright position. A cover 14 is located adjacent the center of the channel 11 so that the cover 14 can be moved in opposite directions to overlap the ends of fully retracted main arms 2 to hold the main arms 2, with the material arms 3, braces 5 and 6 and extension arm 4 all nested within the channel 11

Figure 8:
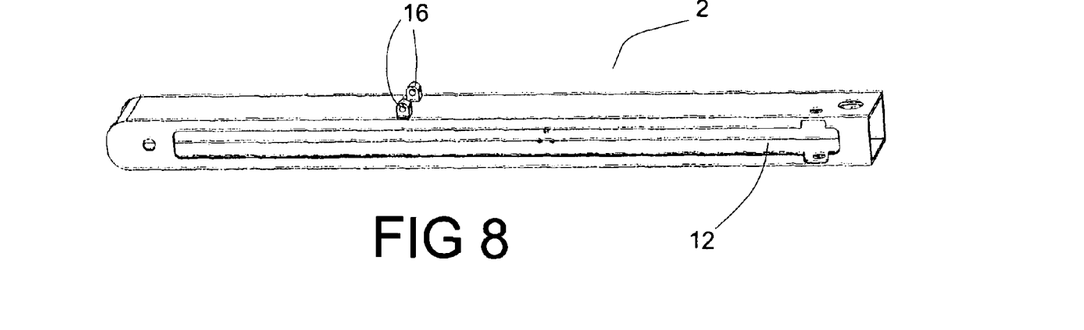
FIG. 8 is a view of the Main Arm 2. Main arms are mounted on the front and back of each housing.
Figure 9:
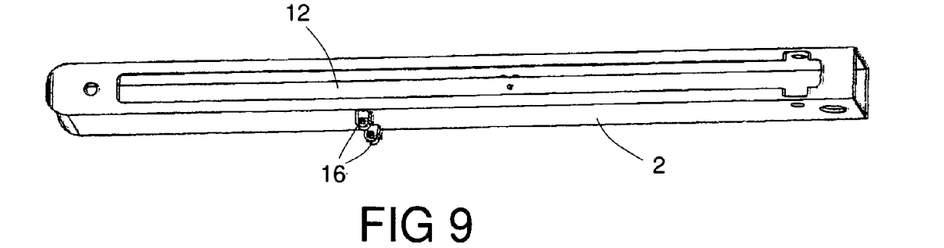
FIG. 9 is a view of the Main Arm 2 with the opening on the opposite side from FIG. 8.

FIGS. 8 and 9 is a view of one of the main arms 2 showing two pivot fins 16, each including a pivot aperture aligned with another pivot aperture in the parallel pivot fin 16. These pivot fins 16 extend from one side wall of the main arm 2 and will receive a pivot pin attaching the corresponding main brace 5 to each main arm 2. The main arm brace 5 rotates around the pivot point formed at the position on the main arm 2 as the main arm brace 5 rotates relative to the main arm 2 during erection or retraction of the main arm 2. For storage, the main arm brace 5 will lay flat against this side of the main arm 5. The fore and aft main arms 2 will pivot in opposite directions so the pivot fins 16 are located on opposite side walls of the main arm 2 as indicated in FIGS. 8 and 9.

Figure 10:
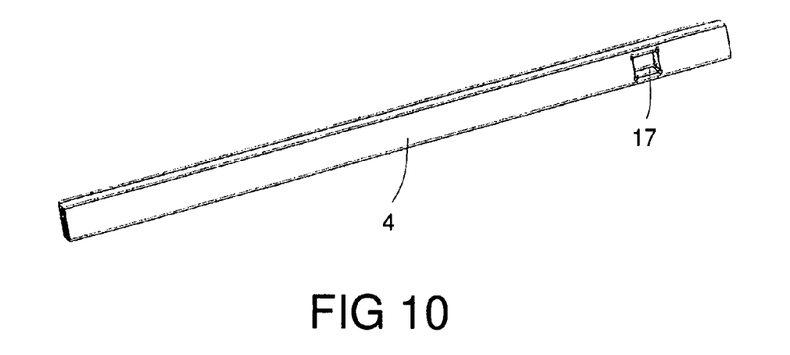
FIG. 10 is a view of the Extension Arm 4.

FIG. 10 shows the extension arm 4, which is mounted in the material arm. A square opening 17 provides a surface for latching the extension arm into a projection on the material arms 3 by engaging a detent ball.

FIGS. 11-16 are views of accessory devices that can be employed with the main ladder rack 10 to enhance the capabilities of the ladder rack 10.

Figure 11A:
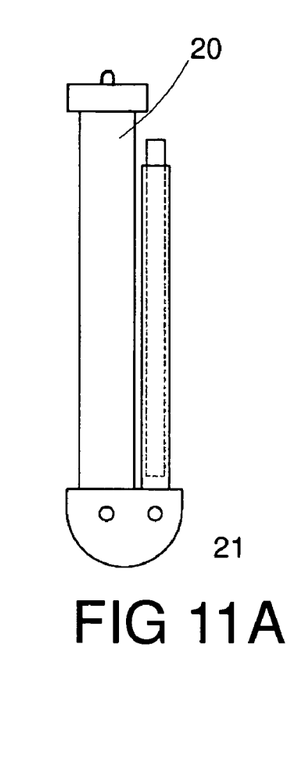
FIG. 11A shows the ladder rack extender in a folded configuration.
Figures 11B, 11C:
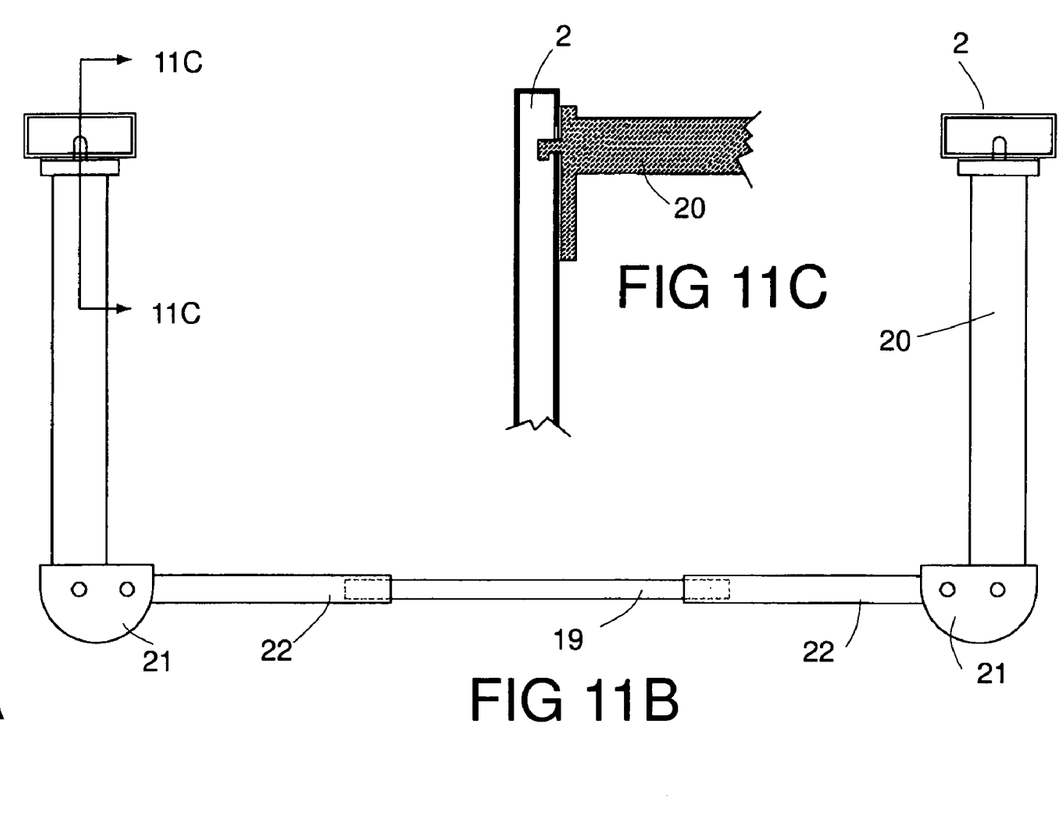
FIG. 11B shows the extender attached to main arms.
FIG. 11C shows the method of attachment.
Figure 12:
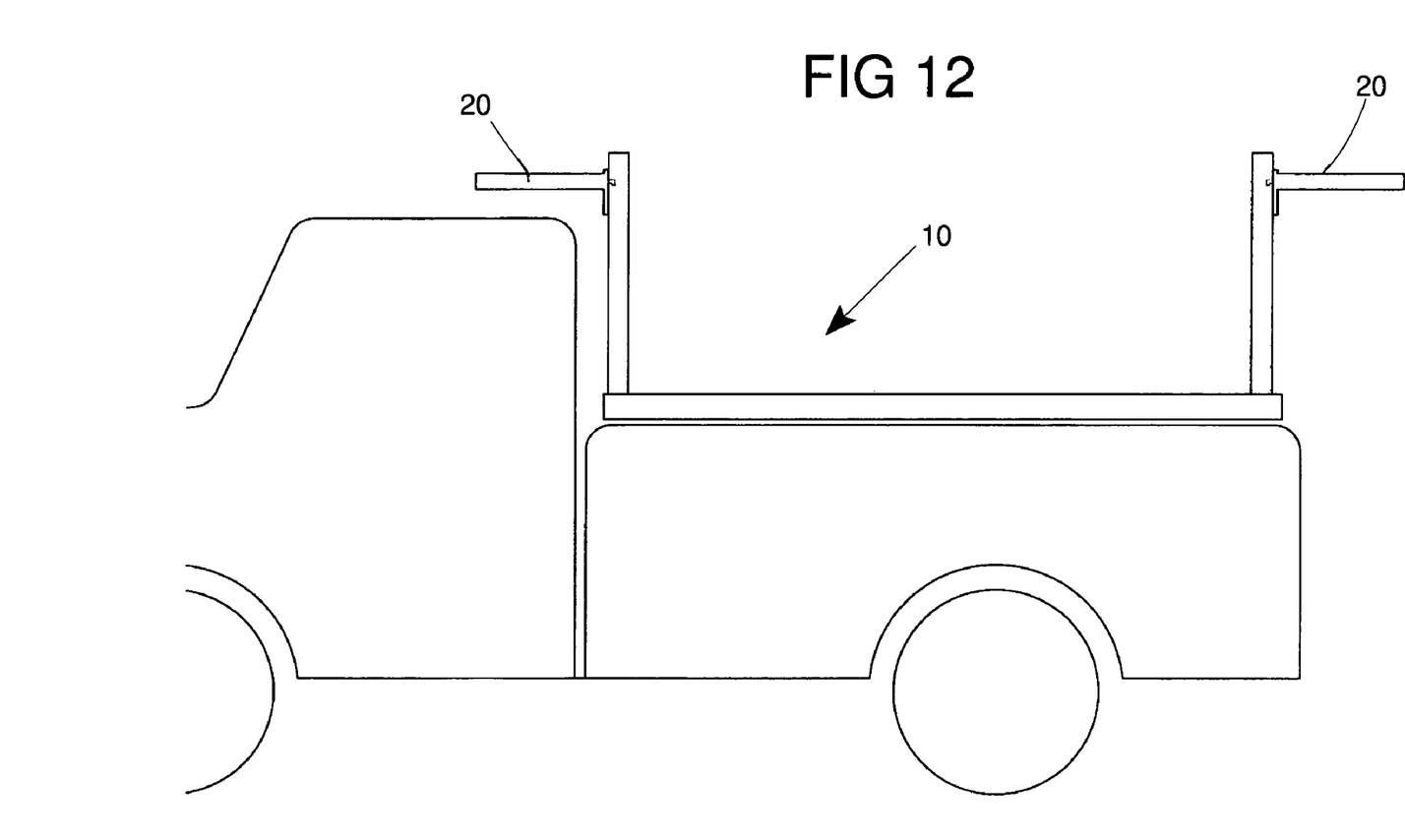
FIG. 12 is a side view showing Ladder Rack Extenders mounted on the ladder rack.

FIGS. 11A-C are views of Ladder Rack Extenders, an accessory for the collapsible ladder rack system. The main components include an Accessory Main Arm 20, Hinge 21, Accessory Material Arm 22, Accessory Extension Arm 23. FIG. 12 is a side view of the Ladder Rack Extenders mounted on the fully actuated collapsible ladder rack system. What is seen is the Accessory Main Arms 20.

Figures 13A, 13B:
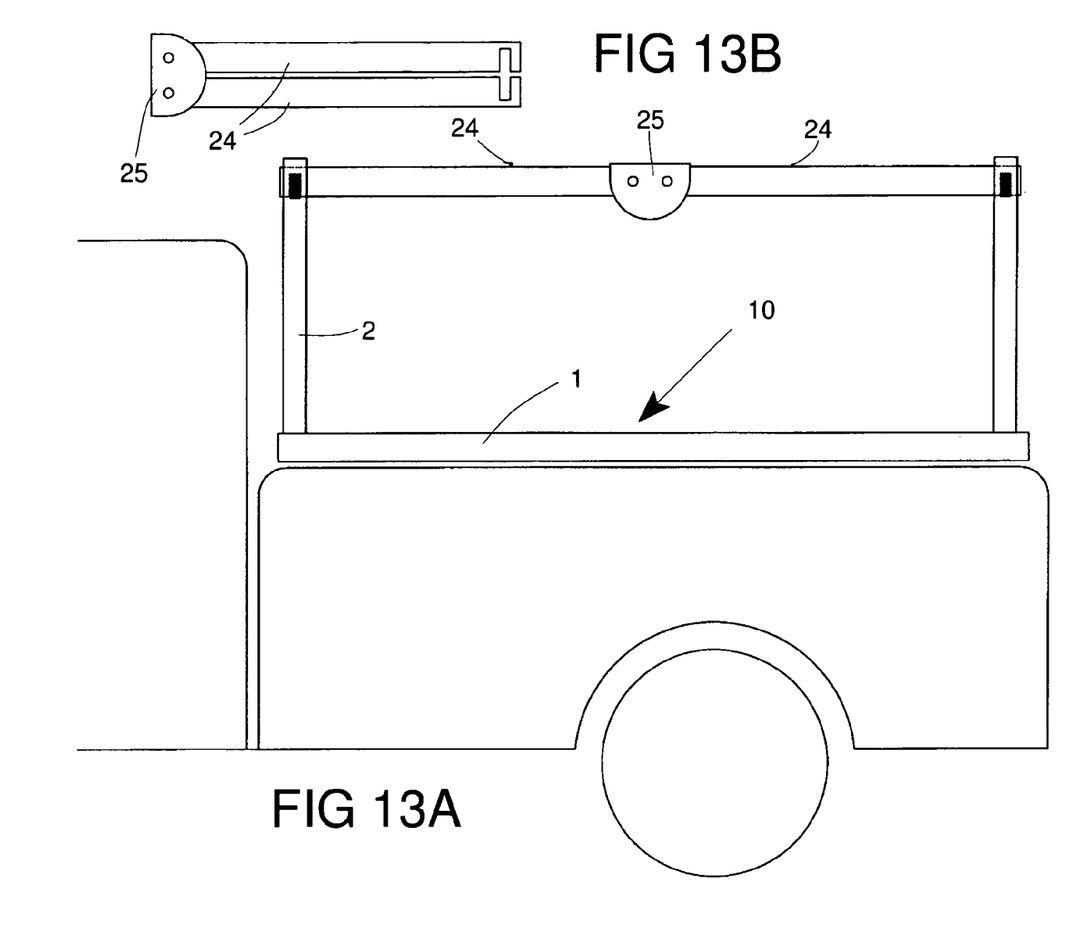
FIG. 13A shows the sheet goods carrier in a folded configuration.
FIG. 13B shows the sheet goods carrier mounted on a pickup truck.

Another accessory device is a sheet goods carrier that can be mounted between front and rear main arms 2 above the sides of the truck bed so that sheet goods, such as plywood, and be carried on the ladder rack 10. FIG. 13 A shows a collapsed view and FIG. 13 B is a fully actuated view of the Sheet Goods Carrier, an accessory for the collapsible ladder rack system, including the following components: Sheet Goods Material Arm 24, Sheet Goods Hinge 25.

Figure 14:
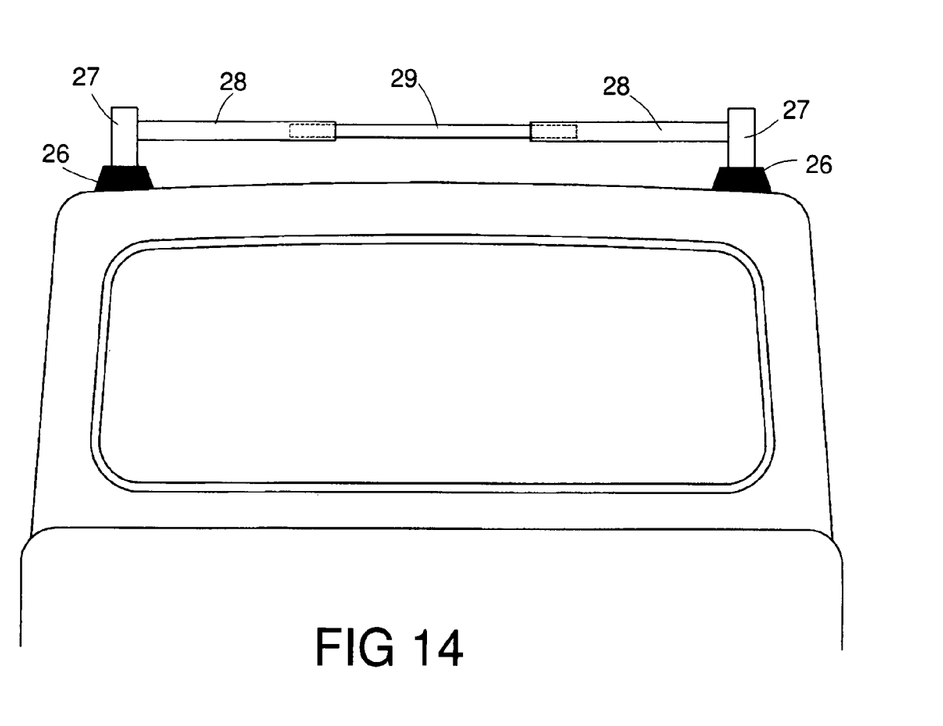
FIG. 14 is a rear view of a roof mounted rack.
Figure 15A:
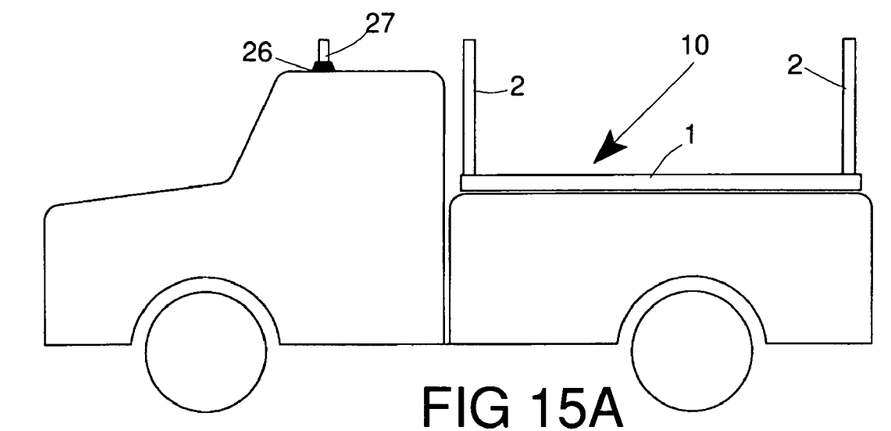
FIGS. 15A and 15B are two side views showing two ways of using the roof mounted rack.
Figure 15B:
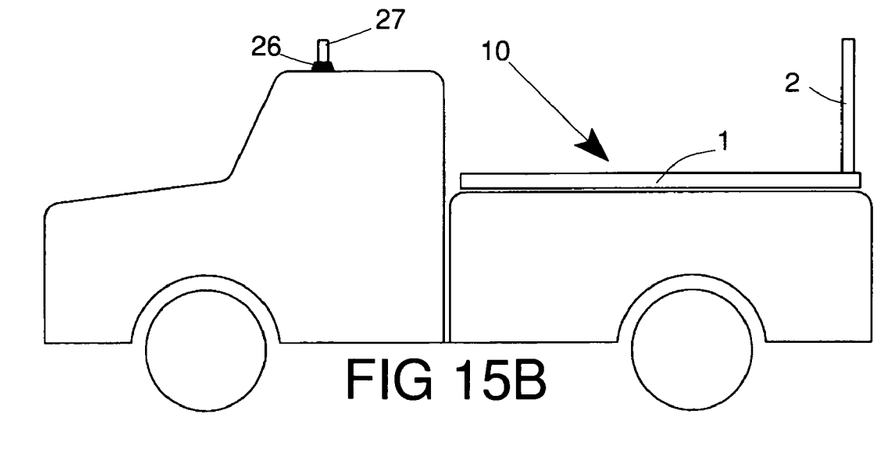

Other accessories can be mounted on the truck but not mounted directly to the ladder rack 10. These accessories will work with the ladder rack 10. FIG. 14 is a rear view of the Roof Mounted Rack, an accessory for the collapsible ladder rack system, and consists of the following components: Roof Mount 26, Roof Main Arm 27, Roof Material Arm 28, Roof Extension Arm 29. FIGS. 15A and 15B shows side views of the collapsible ladder rack and the roof mounted rack. FIG. 15A shows the roof mounted rack used in conjunction with either the long or short bed version of the collapsible ladder rack. FIG. 15B shows the roof mounted rack used in conjunction with the extra short or sport version of the collapsible ladder rack.

Figure 16:
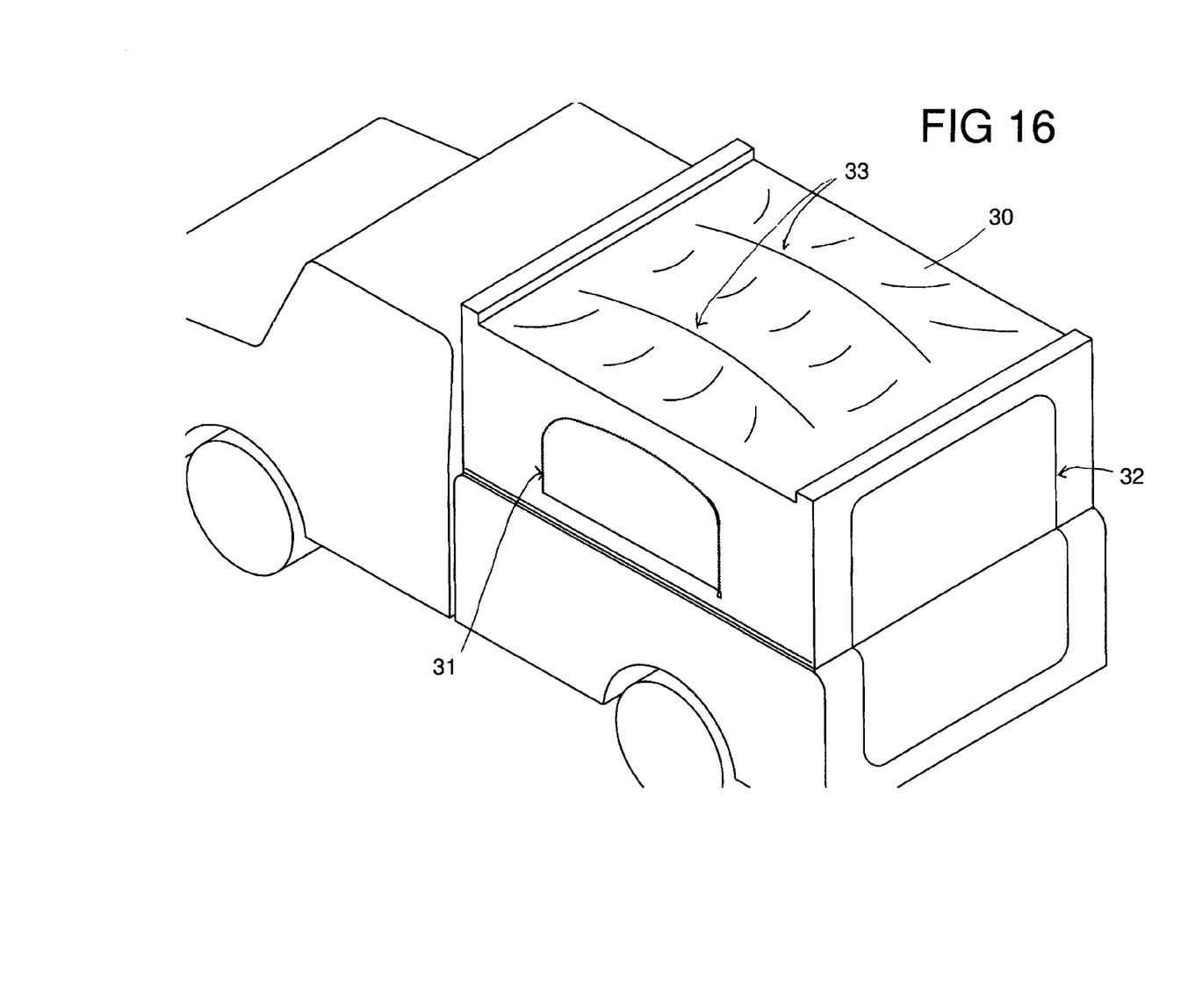
FIG. 16 is a view of the Foldable Fabric Shell.

FIG. 16 is a view of the Foldable Fabric Shell. As a unit, it will fit over the collapsible ladder rack system to create a camper shell. It consists of the following components: Fabric Shell 30, side zipper for opening the side of the shell 31, back zipper for opening the rear of the shell 32, light gauge metal or plastic ribs 33, front zipper not shown for opening the front of the shell 34.

While the present invention has been described in terms of specific embodiments, it is to be understood that the invention is not limited to these disclosed embodiments. This invention may be embodied in many different forms and should not be construed as limited to the embodiments set forth herein; rather, these embodiments are provided by way of illustration only and so that this disclosure will be thorough, complete and will fully convey the full scope of the invention to those skilled in the art. Indeed, many modifications and other embodiments of the invention will come to mind of those skilled in the art to which this invention pertains, and which are intended to be and are covered by both this disclosure, the drawings and the claims.

I claim:

1. A rack for use on a vehicle having a flat bed to carry a ladder, the rack comprising:

a pair of housings mountable to the vehicle on opposite sides of the flat bed and extending between front and back ends of the flat bed;

upright main arms attached to the housings at four corners of the flat bed, each upright main arm being hinged relative to the housing to which the main arm is attached, each main arm being foldable from an upright position toward a central section of the housing to which the main arm is attached, each main arm including side walls extending upwardly from opposite ends of a base wall so that the side walls and the base wall form a U-shaped member with a main arm channel being defined between the side walls, each channel opening inwardly to face a channel on an upright main arm attached to a housing on an opposite side of the flat bed;

a material arm mounted on an upper end of each upright main arm to support a ladder when the material arm is in an operative position, each material arm being hinged relative to the upright main arm on which the corresponding material arm is mounted, each material arm spanning and being foldable into the main arm channel on the main arm to which the material arm is attached so that each material arm is foldable into a corresponding main arm channel and each main arm is foldable relative to the corresponding housing after the material arms are folded into corresponding channels; and wherein each housing comprises a U-shaped member, with an upwardly open U-shaped housing channel being formed on each housing, main arms attached to each housing being folded into corresponding U-shaped housing channels after the material arms have been folded into the corresponding main arm channel; and wherein a main arm brace extends between each main arm and the corresponding housing to which each material arm is attached, each main arm brace locking the corresponding material arm in an upright position wherein each main arm brace is foldable between the corresponding main arm and corresponding housing and is foldable into the corresponding housing when the main arm is folded into the corresponding housing; and wherein a material arm brace extends between each main arm and the corresponding material arm, each material arm brace being foldable between the corresponding material arm and the corresponding main arm and being foldable into the corresponding main arm when the material arm is folded into the corresponding main arm.

2. The rack of claim 1 wherein each material arm comprises a tube having a rectangular cross section.

3. The rack of claim 2 wherein an extension arm is attachable to selected material arms, each extension arm telescoping relative to the corresponding material arm to which the extension arm is attached.

4. The rack of claim 3 wherein each extension arm comprises a tube having a rectangular cross section.

5. The rack of claim 4 wherein each extension arm is insertable into an opposed material arm in an extended position.

6. The rack of claim 1 wherein a material arm brace extends between a corresponding main arm and a corresponding material arm, each material arm brace locking the material arm in a horizontal position relative to the corresponding main arm.

7. A rack for use on a pickup truck comprising:
   two housings, each attachable to rails on a side of a bed on the pickup truck;
   four main arms attached at lower ends thereof to opposite ends of each housing;
   main arm braces extending between main arms and the housing from which the corresponding main arm extends, the main arm braces securing the main arm in an upright position relative to the housings;
   material arms attached to each main arm at upper ends of corresponding main arms, and extending horizontally relative to material arms in an upright position;
   material arm braces extending between main arms and the material arm from which the corresponding main arm extends, the material arm braces securing the material arms in a horizontal position relative to the main arms, and being foldable with the material arm into a corresponding main arm;
   the main arm braces being unlockable from the housings and the material arm braces being unlockable from the main arms so that the material arms and main arms are foldable relative to each other and relative to the housing so that the material arms and material arm braces are foldable into the main arms, and the main arm braces and the main arms, with material arms and material arm braces nested therein, are foldable into the housings to position the rack in a folded configuration on top of the rails on the pickup truck.

8. The rack of claim 7 wherein the housings and the main arms each have U-shaped cross sections with housing channels extending along the length of the housings and main arm channels along the length of the main arms.

9. The rack of claim 8 wherein the housing channels and the main arm channels are parallel to mutually perpendicular planes so that the housing channel are upwardly open and the main arm channels are open on vertical sides of the main arms when in an upright configuration.

10. The rack of claim 7 wherein an extension arm extends between material arms attached to different main arms.

11. The rack of claim 7 further including sheet goods carrier arms attachable above each housing at the top of front and rear main arms extending upwardly from the corresponding housing, the sheet goods carrier arms being attachable to and detachable from the main arms and providing means for supporting sheet goods carried by the rack.

12. The rack of claim 7 including an extender member attachable to rear material arms and extending rearwardly beyond rear material arms to increase the length of the rack, the extender member includes rearwardly extending arms attached to each rear material arm and a laterally extending extender arm joining the two rear material arms.

13. The rack of claim 7 including a foldable fabric camper shell.

14. A rack attachable to and removable from bed rails extending upwardly on opposite sides of a bed on a motor vehicle, portions of the rack being shiftable between a collapsed position and an upright position, the rack comprising:
   separate upwardly facing channels formed on a U-shaped housing attachable to the bed rails; the portions of the rack being shiftable between a collapsed position and an upright position further comprising
   separate inwardly facing channels securable in the upright position and formed on U-shaped main arms hinged relative to the U-shaped housings, each inwardly facing channel facing a channel on an U-shaped main arm attached to a housing on an opposite side of the bed of the motor vehicle; and
   front and rear material arms hinged relative to the main arms at the front and rear of each housing, and securable to the main arms when the main arms are in the upright position to support loads on top of and extending between the front and rear material arms; the front and rear material arms being foldable into the inwardly facing channels, and the main arms, with the material arms received within inwardly facing channels, being foldable into the upwardly facing channels on the U-shaped housings so that the material arms are nested into the main arms and the main arms are in turn nested into the housings in the collapsed position.

15. The rack of claim 14 wherein the thickness of walls forming the U-shaped main arms is greater than the thickness of the material arms to provide additional load carrying capability to the main arms.

16. The rack of claim 14 including material arm braces extending between the main arms and the material arms and foldable into the main arm U-shaped channels, and main arm braces extending between the main arms and the housing and foldable into the housing U-shaped channels, the material arm braces being lockable in place when the main arms are in the upright position and unlockable to fold into the main arm U-shaped channels.

* * * * *